(12) United States Patent
Ozaki et al.

(10) Patent No.: US 8,021,052 B2
(45) Date of Patent: Sep. 20, 2011

(54) SENSOR-EQUIPPED BEARING FOR WHEEL

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 621 days.

(21) Appl. No.: 12/086,153

(22) PCT Filed: Nov. 16, 2006

(86) PCT No.: PCT/JP2006/322849
§ 371 (c)(1),
(2), (4) Date: Jun. 6, 2008

(87) PCT Pub. No.: WO2007/066482
PCT Pub. Date: Jun. 14, 2007

(65) Prior Publication Data
US 2009/0080822 A1    Mar. 26, 2009

(30) Foreign Application Priority Data

Dec. 8, 2005   (JP) ................................. 2005-354246

(51) Int. Cl.
*F16C 19/08* (2006.01)
*F16C 41/00* (2006.01)
*G01B 7/16* (2006.01)
(52) U.S. Cl. .................... 384/448; 384/544; 324/207.13
(58) Field of Classification Search .................. 384/448, 384/544; 324/173–174, 207.12, 207.25; 73/117.01, 146, 494
See application file for complete search history.

(56) References Cited

U.S. PATENT DOCUMENTS

| 5,129,743 | A  |   | 7/1992  | Faye et al. |
| 5,140,849 | A  |   | 8/1992  | Fujita et al. |
| 5,143,458 | A  |   | 9/1992  | Alff et al. |
| 5,385,411 | A  |   | 1/1995  | Shirai et al. |
| 5,974,665 | A  | * | 11/1999 | Frielingsdorf et al. ..... 29/898.09 |
| 5,997,182 | A  | * | 12/1999 | Brown .......................... 384/448 |
| 6,109,793 | A  | * | 8/2000  | Miyazaki ...................... 384/448 |
| 6,354,952 | B1 | * | 3/2002  | Boulton et al. ............... 464/145 |
| 6,406,186 | B1 | * | 6/2002  | Torii et al. .................... 384/448 |
| 6,626,581 | B2 | * | 9/2003  | Uchman ........................ 384/544 |
| 6,715,926 | B2 |   | 4/2004  | Tajima et al. |
| 6,802,208 | B2 |   | 10/2004 | Chinitz et al. |

(Continued)

FOREIGN PATENT DOCUMENTS

CN           1455233          11/2003

(Continued)

OTHER PUBLICATIONS

English translation of the international preliminary report on patentability mailed Jun. 19, 2008, in corresponding International Application No. PCT/JP2006/322849.

(Continued)

*Primary Examiner* — Marcus Charles

(57) ABSTRACT

In a wheel support bearing assembly having rows of rolling elements interposed between an outer member and an inner member, spacers are interposed between vehicle body fitting holes in the outer member, which is a stationary member, and a knuckle. A sensor unit including a sensor mounting member and a strain sensor is fitted to the outer member. The sensor mounting member has at least two contact fixing portions fixed to the outer member and, also, has at least one recess between the neighboring contact fixing portions, the strain sensor being disposed in this recess.

7 Claims, 13 Drawing Sheets

U.S. PATENT DOCUMENTS

| | | | |
|---|---|---|---|
| 7,108,427 | B2 | 9/2006 | Joki et al. |
| 7,197,944 | B2 | 4/2007 | Koyagi et al. |
| 7,212,927 | B2 | 5/2007 | Yanagisawa et al. |
| 7,320,257 | B2 | 1/2008 | Takizawa et al. |
| 7,452,133 | B2 | 11/2008 | Ohtsuki et al. |
| 2002/0097040 | A1 | 7/2002 | Takizawa et al. |
| 2002/0118899 | A1 * | 8/2002 | Torii et al. .................... 384/448 |
| 2003/0218548 | A1 | 11/2003 | Sato et al. |
| 2004/0074317 | A1 | 4/2004 | Colombo et al. |
| 2005/0016296 | A1 | 1/2005 | Inoue |
| 2005/0222740 | A1 | 10/2005 | Inoue et al. |
| 2007/0014500 | A1 | 1/2007 | Iwamoto et al. |
| 2008/0285901 | A1 | 11/2008 | Koike et al. |
| 2009/0038414 | A1 | 2/2009 | Ozaki et al. |
| 2009/0097791 | A1 | 4/2009 | Ozaki et al. |
| 2009/0114004 | A1 | 5/2009 | Ozaki et al. |
| 2009/0120184 | A1 | 5/2009 | Ozaki et al. |
| 2009/0129712 | A1 | 5/2009 | Ozaki et al. |

FOREIGN PATENT DOCUMENTS

| | | | |
|---|---|---|---|
| JP | 2531492 | | 9/1992 |
| JP | 2001253206 A * | | 9/2001 |
| JP | 2002-340922 | | 11/2002 |
| JP | 2003-530565 | | 10/2003 |
| JP | 2003-336653 | | 11/2003 |
| JP | 2004-003601 | | 1/2004 |
| JP | 2004069071 A * | | 3/2004 |
| JP | 2004-142577 | | 5/2004 |
| JP | 2004-155261 | | 6/2004 |
| JP | 2004-198247 | | 7/2004 |
| JP | 2004-360782 | | 12/2004 |
| JP | 2005-265175 | | 9/2005 |
| JP | 2006-3268 | | 1/2006 |
| JP | 2006-10477 | | 1/2006 |
| JP | 2006-77807 | | 3/2006 |
| JP | 2007/071280 | | 3/2007 |
| WO | WO 01/77634 A2 | | 10/2001 |
| WO | 2004/018273 | | 3/2004 |
| WO | WO 2004045933 A2 * | | 6/2004 |

OTHER PUBLICATIONS

U.S. Notice of Allowance mailed Sep. 28, 2010 in related U.S. Appl. No. 12/086,089.
U.S. Notice of Allowance mailed Aug. 25, 2010 in related U.S. Appl. No. 12/224,846.
U.S. Appl. No. 11/444,343, filed Jun. 1, 2006, Komori et al., NTN Corporation.
U.S. Appl. No. 11/991,480, filed Mar. 5, 2008, Ozaki et al., NTN Corporation.
U.S. Appl. No. 12/086,089, filed Jun. 5, 2008, Ozaki et al., NTN Corporation.
U.S. Appl. No. 12/224,846, filed Sep. 8, 2008, Ozaki et al., NTN Corporation.
U.S. Appl. No. 11/990,071, filed Feb. 6, 2008, Ozaki et al., NTN Corporation.
Notice of Allowance dated Apr. 5, 2010 issued in corresponding U.S. Appl. No. 12/086,089.
Office Action dated Mar. 5, 2010 issued in corresponding U.S. Appl. No. 11/991,480.
International Search Report mailed Dec. 19, 2006 in connection with the International application PCT/JP2006/322849.
European Search Report dated Apr. 29, 2011 in corresponding European Patent Application 06832738.6.
European Search Report dated May 11, 2011 in corresponding European Patent Application 07713561.4.

* cited by examiner

SENSOR-EQUIPPED BEARING FOR WHEEL

CROSS REFERENCE TO RELATED APPLICATIONS

This application claims the benefit under 35 U.S.C. Section 371, of PCT International Application Number PCT/JP2006/322849, filed Nov. 16, 2006 and Japanese Application No. 2005-354246 filed Dec. 8, 2005 in Japan, the contents of which are incorporated herein by reference.

BACKGROUND OF THE INVENTION

1. Field of the Invention

The present invention relates to a sensor equipped wheel support bearing assembly having incorporated therein a sensor for detecting a load imposed on a bearing area of a vehicle wheel.

2. Description of the Prior Art

For safety travel of an automotive vehicle, the wheel support bearing assembly equipped with a sensor for detecting the rotational speed of one of automotive wheels has hitherto been well known in the art. While the automobile traveling safety precaution is hitherto generally taken by detecting the rotational speed of wheels, it is not sufficient with only the rotational speed of the wheels and, therefore, it is required to achieve a control for safety purpose with the use of other sensor signals.

In view of this, it may be contemplated to achieve an attitude control based on a load acting on each of wheels during travel of an automotive vehicle. By way of example, a large load acts on the outside wheels during the cornering, on the wheels on one side during the run along left and right inclined road surfaces or on the front wheels during the braking, and, thus, a varying load acts on the vehicle wheels. Also, even in the case of the uneven live load, the loads acting on those wheel tend to become uneven. For this reason, if the loads acting on the wheels can be detected as needed, suspension systems for the vehicle wheels can be controlled beforehand based on results of detection of the loads, so that the attitude control of the automotive vehicle during the traveling thereof (for example, prevention of a rolling motion during the cornering, prevention of the front wheel diving during the braking, and prevention of the vehicle wheels diving brought about by an uneven distribution of live loads) can be accomplished. However, no space for installation of the load sensor for detecting the load acting on the respective vehicle wheel is available and, therefore, the attitude control through the detection of the load can hardly be realized.

Also, in the event in the near future the steer-by-wire is introduced and the system, in which the wheel axle and the steering come not to be coupled mechanically with each other, is increasingly used, information on the road surface comes to be required to transmit to the steering wheel hold by a driver by detecting a wheel axis direction load.

In order to meet those needs hitherto recognized, the wheel support bearing assembly has come to be suggested, in which a strain gauge is applied to to an outer ring of the wheel support bearing assembly so as to detect the strain. (See, for example, the Published International Application WO01/077634).

The outer ring of the wheel support bearing assembly is a bearing component part, which has raceway surfaces and is required to have a strength and which is manufactured through complicated process steps including, for example, plastically deforming, turning, heat treatment and grinding. For this reason, where the strain gauge is affixed to the outer ring such as disclosed in the above mentioned published patent document, there are problems in that the productivity becomes low and the cost at the time of mass-production is raised. Also, the prior art wheel support bearing assembly represented by the one disclosed in the above mentioned publication has a problem in that since bearing component parts have a high rigidity and the strain occurring in a stationary member is low, it is difficult to detect the load acting on the vehicle wheel with high sensitivity.

SUMMARY OF THE INVENTION

An object of the present invention is to provide a wheel support bearing assembly, in which a load detecting sensor can be installed neatly and snugly, the load imposed on the vehicle wheel can be detected with high sensitivity, and the cost of mass-production is low.

The sensor equipped wheel support bearing assembly of the present invention for rotatably supporting a vehicle wheel relative to a vehicle body structure includes an outer member having an inner periphery formed with a plurality of rows of raceway surfaces, an inner member having an outer periphery formed with raceway surfaces in face-to-face relation with the raceway surfaces in the outer member, and a plurality of rows of rolling elements interposed between those raceway surfaces, respectively. One of the outer member and the inner member, which serves as a stationary member, has a vehicle body fitting flange having vehicle body fitting holes defined therein and a spacer is provided between a portion of the vehicle body fitting flange around each of the vehicle body fitting holes and a knuckle forming a part of a suspension system in the vehicle body structure, with a gap formed between respective opposed surfaces of the stationary member and the knuckle except the spacer, and the stationary member and the knuckle are held in contact with each other through the respective spacer. A sensor unit including a sensor mounting member and a strain sensor mounted on the sensor mounting member is fitted to the stationary member, and the sensor mounting member has at least two contact fixing portion fixed to the stationary member and also has at least one recess between the neighboring contact fixing portions, with the strain sensor arranged in this recess.

For example, where the outer member serves as the stationary member and the inner member serves as a rotatable member, the sensor unit referred to above is fitted to the outer member.

When a load acts on the rotatable member as a result of travel of the automotive vehicle, the stationary member undergoes deformation through the rolling elements and this deformation brings about a strain on the sensor unit. The strain sensor provided in the sensor unit detects the strain occurring in the sensor unit. If the relation between the strain and the load is predetermined by means of a series of experiments or simulations, the load or the like acting on the vehicle wheel can be detected in reference to an output from the strain sensor. In other words, an external force acting on the wheel support bearing assembly, or a force acting between the wheel tire and the road surface, or a preload in the wheel support bearing assembly can be inferred from the output of the strain sensor. Also, the load or the like so detected can be utilized in vehicle control of the automotive vehicle.

Since in this sensor equipped wheel support bearing assembly the strain sensor is mounted on the sensor mounting member that is fitted to the stationary member, the load sensor can be installed snugly and neatly in the automotive vehicle. Since the sensor mounting member is a handy component part that is fitted to the stationary member, mounting of the strain sensor on this sensor mounting member improves mass productivity, making it possible to lower the manufacturing cost.

In general, the wheel support bearing assembly has various component parts of high rigidity in order to secure the performance thereof. Since for this reason, the strain occurring in the stationary member is small and furthermore, it may occur that the relation between the strain occurring in the sensor unit and the force acting between the wheel tire and the road surface may vary depending on the interference between the stationary member and the knuckle as well as the mounting position, difficulty often occur in detecting the load with the sensor unit. In this respect, with the sensor equipped wheel support bearing assembly of the present invention, the spacer intervenes between that portion of the vehicle body fitting flange around each of the vehicle body fitting holes, which are defined in the stationary member, and the knuckle forming a part of the suspension system in the vehicle body structure, and the stationary member and the knuckle contact with each other through the spacer while the gap formed between respective opposed surfaces of the stationary member and the knuckle except the spacer. Accordingly, the area of tight contact between the stationary member and the knuckle is rendered so small that the amount of deformation of the stationary member may be large and, consequently, the strain occurring in the sensor mounting member can be detected with high precision, allowing the sensor unit to detect even the slight strain in the stationary member.

The spacer referred to above can be formed by a spacer member separate from the stationary member and the knuckle. In such case, when engaged in a recess defined in the knuckle and the vehicle body fitting hole in the stationary member, the wheel support bearing assembly may be positioned relative to the knuckle.

Even when in place of the spacer member that is a separate member, a projection, as a spacer, may be integrally formed around the vehicle body fitting hole in a side face of the stationary member, which confronts the knuckle, and the stationary member is engaged with the knuckle at this projection, effects similar to those afforded by the use of the separate spacer member can be obtained. Also, even when in place of the separate spacer member, a projection, as a spacer, may be provided around a bolt insertion hole in the side face of the knuckle, which confronts the stationary member, and the knuckle is held in contact with the stationary member at this projection, similar effects can be obtained.

Also, since the sensor mounting member of the sensor unit includes at least two contact fixing portions fixed to the stationary member and at least one recess exists between the neighboring contact fixing portions and the strain sensor is arranged in this recess, a larger strain than that in the stationary member occurs in the place where the strain sensor is arranged. As a result of the rigidity being lowered, and, therefore, the strain in the stationary member can be detected with high accuracy.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
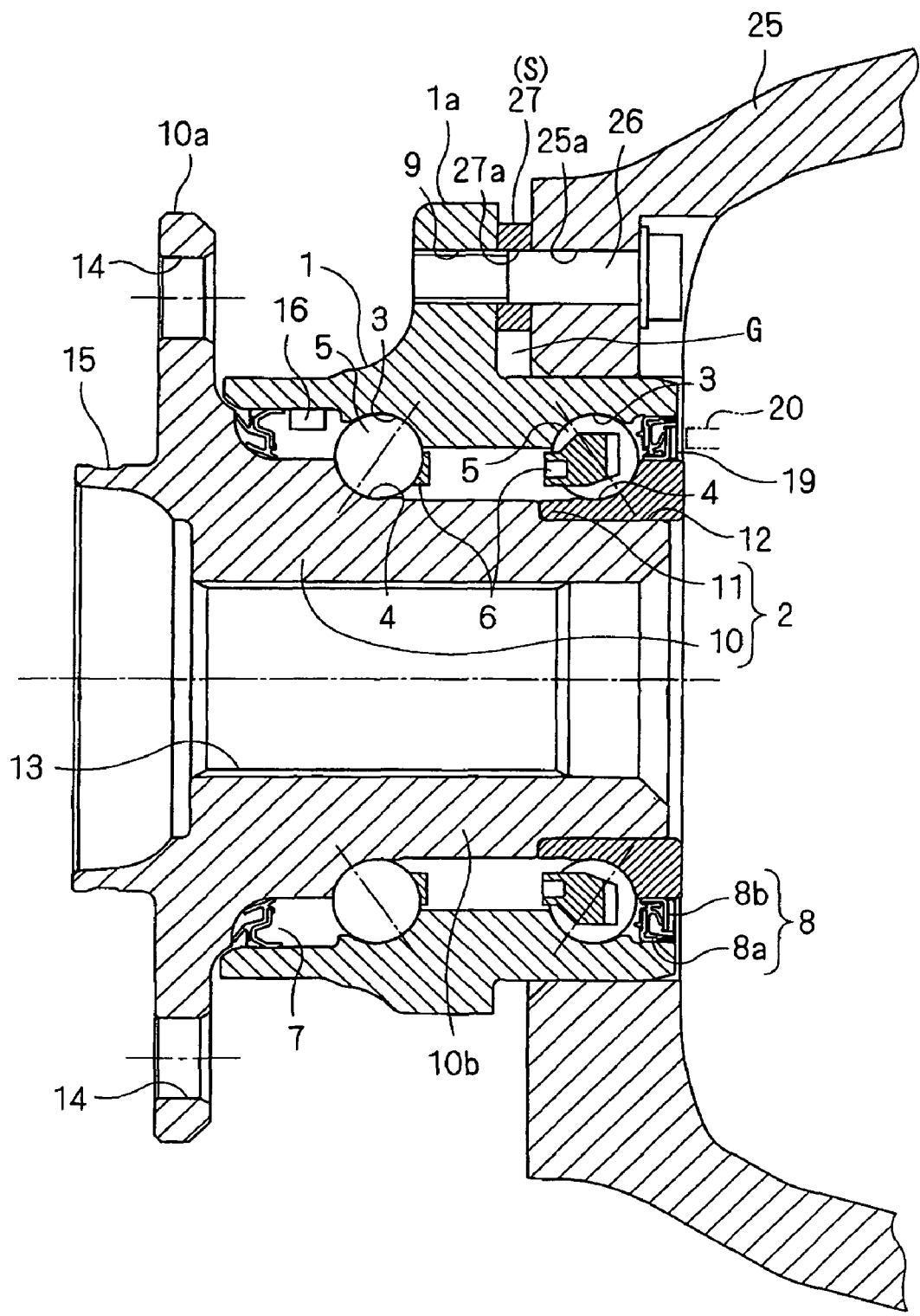
FIG. 1 is a longitudinal sectional view of a sensor equipped wheel support bearing assembly according to a first preferred embodiment of the present invention.
Figure 2:
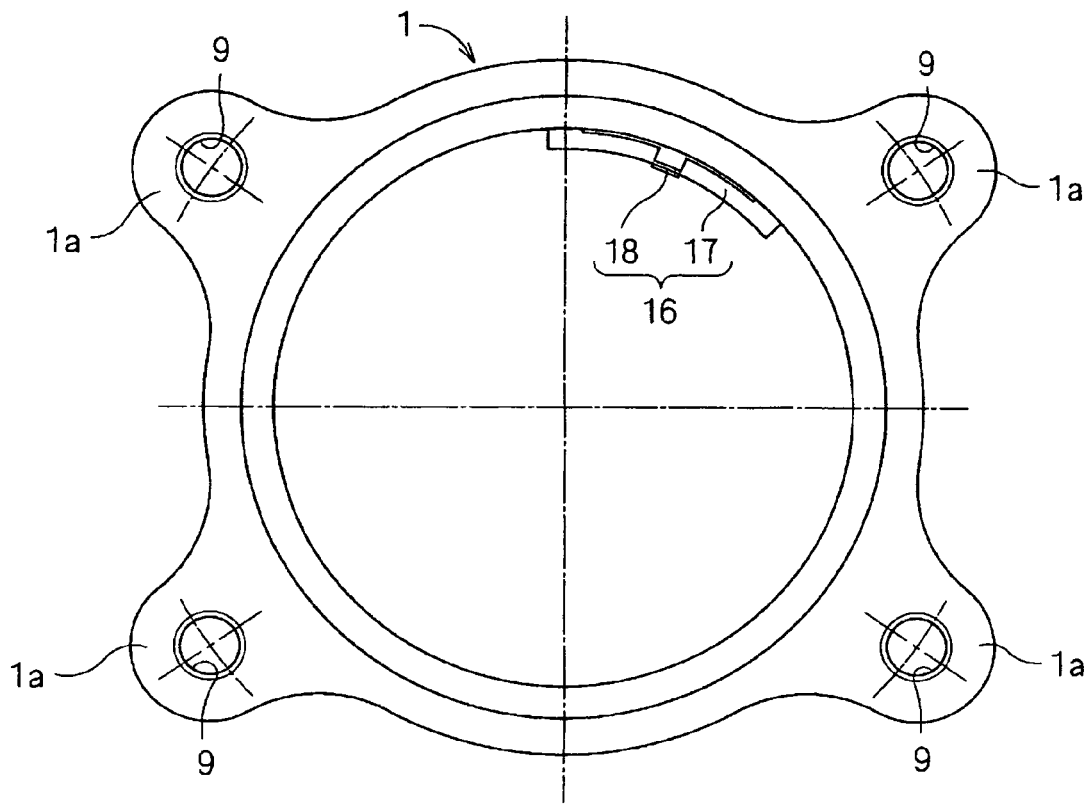
FIG. 2 is a front elevational view of an outer member employed in the wheel support bearing assembly, as viewed from the outboard side.

The first preferred embodiment of the present invention will now be described with particular reference to FIGS. 1 to 3. This embodiment is applied to a wheel support bearing assembly for rotatably supporting a vehicle drive wheel, which is an inner ring rotating model of a third generation type. It is to be noted that in the specification herein set forth, the term "outboard" is intended to mean one side of an automotive vehicle body away from the longitudinal center of the automotive vehicle body, whereas the term "inboard" is intended to mean the opposite side of the automotive vehicle body close towards the longitudinal center of the automotive vehicle body.

The illustrated wheel support bearing device includes an outer member 1 having an inner periphery formed with a plurality of rows of raceway surfaces 3, an inner member 2 having an outer periphery formed with raceway surfaces 4 formed in face-to-face relation with those raceway surfaces 3, and a plurality of rows of rolling elements 5 interposed between the raceway surfaces 3 in the outer member 1 and the raceway surfaces 4 in the inner member 2. The wheel support bearing device is rendered to be of a double row, angular contact ball bearing type, and the rolling elements 5 are employed in the form of a ball and supported by respective retainers 6 one employed for each of the rows of the rolling elements 5. The raceway surfaces 3 and 4 referred to above have an arcuate shape in cross-section and are so formed as to represent respective rolling element contact angles that are held in back-to-back relation with each other. Opposite open ends of an annular bearing space delimited between the outer member 1 and the inner member 2 are sealed respectively by outboard and inboard sealing units 7 and 8.

The outer member 1 serves as a stationary member and is of one-piece construction having an outer periphery formed with a vehicle body fitting flange 1a that is secured to an automobile suspension system (not shown) mounted on an automotive body structure. Spacers S each in the form of a spacer member 27 are interposed between a respective portion of the vehicle body fitting flange 1a around each of four vehicle body fitting holes 9 each in the form of a screw hole and a knuckle 25. The vehicle body fitting flange 1a is fixedly secured to the knuckle 25 by means of a corresponding knuckle bolt 26, which is passed through bolt insertion holes 25a and 27a defined respectively in the knuckle 25 and the respective spacer member 27. In this condition, excluding the four spacer members 27, a gap G is formed between the outer member 1 and the knuckle 25.

It is to be noted that each of the vehicle body fitting holes 9 in the vehicle body fitting flange 1a may be a simple bolt insertion hole with no screw thread and the knuckle 25 may be fixedly secured to the vehicle body fitting flange 1a with a nut fastened onto a corresponding knuckle bolt 26.

On the other hand, the inner member 2 serves as a rotatable member and is made up of a hub axle 10 having an outer periphery formed with a wheel mounting hub flange 10a, and an inner ring 11 mounted on an inboard end of an axle portion 10b of the hub axle 10. The raceway surfaces 4 one for each row are formed in the hub axle 10 and the inner ring 11, respectively. The inboard end of the hub axle 10 has its outer periphery provided with an inner ring mounting surface 12 which is radially inwardly stepped to have a small diameter, and the inner ring is mounted on this inner ring mounting surface 12. The hub flange 10a is provided with a plurality of press-fitting holes 14 defined at respective locations circumferentially thereof for receiving corresponding hub bolts (not shown) to be press-fitted in the holes 14. At a portion of the hub axle 10 adjacent the root of the hub flange 10a, a cylindrical pilot portion 15 for guiding a vehicle wheel and a brake component parts (both not shown) protrudes towards the outboard side.

A sensor unit 16 is mounted on an inner periphery of a portion in the vicinity of an outboard end of the outer member 1. The circumferential position where this sensor unit 16 is mounted is chosen to be between the neighboring two vehicle body fitting holes 9, which are remote from the road surface, that is, a position corresponding to a circumferential position interposing the neighboring two vehicle body fitting holes 9, as shown in FIG. 2. The sensor unit 16 includes a sensor mounting member 17 fixed to the inner periphery of the outer member and a strain sensor 18 affixed to the sensor mounting member 17 and operable to measure a strain occurring in the sensor mounting member 17.

Figure 3A:
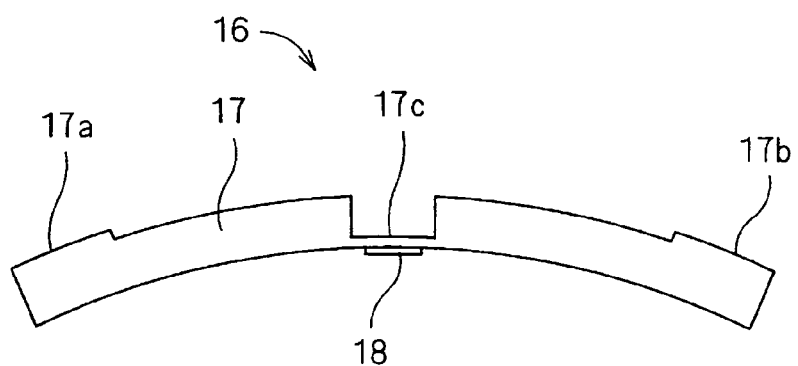
FIG. 3A is a side view of a sensor unit employed in the wheel support bearing assembly.
Figure 3B:
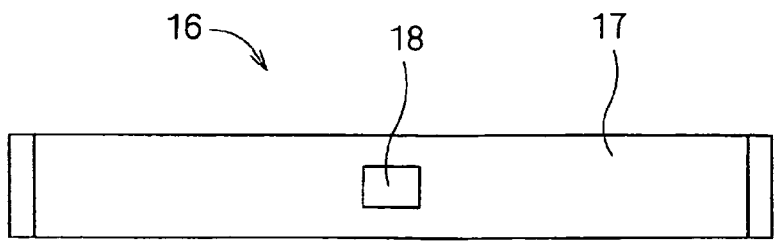
FIG. 3B is a rear view of the sensor unit shown in FIG. 3A.

As shown respectively in side and rear views in FIGS. 3A and 3B, the sensor mounting member 17 is of a generally elongated, arcuate shape extending along the outer member and has opposite ends formed with respective contact fixing portions 17a and 17b of an arcuate shape protruding radially outwardly and, also extending in a circumferential direction. This sensor mounting member 17 has an intermediate portion formed with a recess 17c open at an outer periphery thereof and a sensor 18 is affixed to a portion of an inner periphery of the sensor mounting member 17 aligned with the recess 17c. The sensor mounting member 17 represents, for example, a rectangular figure in its cross sectional shape excluding the recess 17c, but it may have any suitable shape.

The sensor unit 16 referred to above is fixedly secured to the outer member 1 through the contact fixing portions 17a and 17b in the sensor mounting member 17. Fixing of the contact fixing portions 17a and 17b to the outer member 1 is carried out by the use of bolts or a bonding agent. It is to be noted that a gap is formed between the sensor mounting member 17 and the outer member 1 except for respective portions that are occupied by the contact fixing portions 17a and 17b.

In the case of this embodiment, the sensor unit 16 is so arranged and so positioned that one of the contact fixing portions, for example, the contact fixing portion 17a, occupies a zenith position right above the longitudinal axis of the outer member 1 whereas the other contact fixing portion 17b occupies a position spaced a few tens degrees from the zenith position in a circumferential direction of the outer member 1. The zenith position lying on the circumference of the outer member 1 is where when an axially acting load is imposed on the outer member 1, the outer member 1 can be most deformed in a radial direction thereof whereas the position circumferentially spaced a few tens degrees from the zenith position is where the outer member 1 can be little deformed in the radial direction thereof.

The sensor mounting member 17 is preferably of a kind which does not plastically deform when an external force acting on the wheel support bearing assembly or a force acting between the wheel tire and the road surface attains the highest expected value. Accordingly, any one of metallic material such as, for example, steel, copper, brass and aluminum can be suitably employed as material for the sensor mounting member 17.

It is to be noted that the inboard sealing unit 8 is made up of a seal element 8a, made of an elastic material such as, for example, rubber, equipped with a core member made of metal and fitted to an inner peripheral surface of the outer member 1, and a slinger 8b fitted to an outer peripheral surface of the inner ring 10 and engageable with the seal element 8a. A magnetic encoder 19 for detecting the rotation, which is in the form of a multipolar magnet having magnetic poles alternating in a direction circumferentially thereof, is mounted on the slinger 8b. Cooperable with this magnetic encoder 19 is a magnetic sensor 20 that is fitted to the outer member 1 in face-to-face relation with the magnetic encoder 19.

Figure 4:
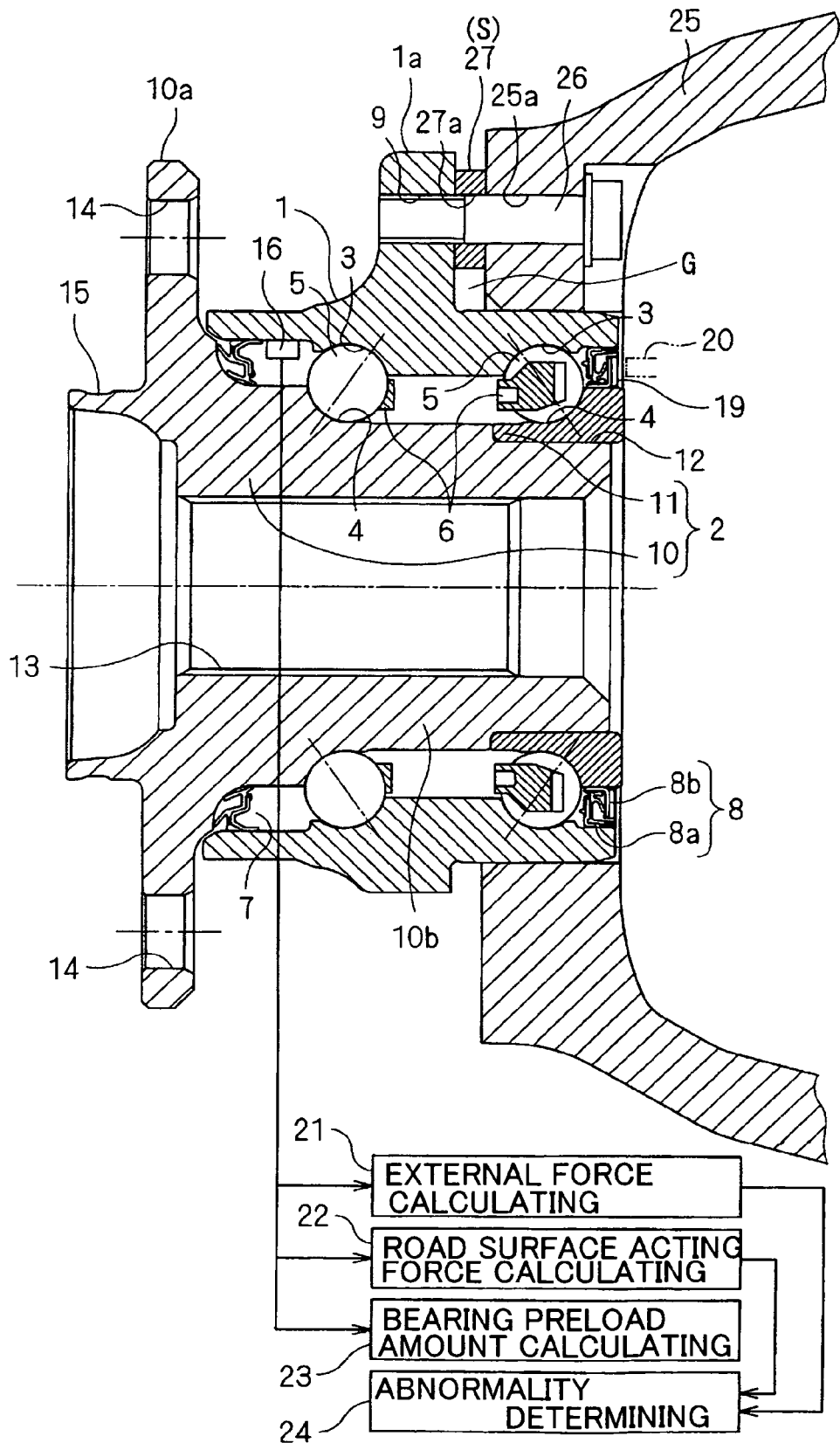
FIG. 4 is a diagram showing a longitudinal sectional view of the wheel support bearing assembly together with a circuit block diagram of a conceptual construction of a detecting system employed therein.

Referring now to FIG. 4, as a means for processing an output from the sensor unit 16, a circuit unit is provided, which includes an external force calculating section 21, a road surface acting force calculating section 22, a bearing preload amount calculating section 23 and an abnormality determining section 24. This circuit unit including those sections 21 to 24 may be incorporated in an electronic circuit device (not shown) such as, for example, a circuit substrate fitted to the outer member 1 or the like of the wheel support bearing assembly, or in an electric control unit (ECU) mounted on the automotive vehicle.

The operation of the sensor equipped wheel support bearing assembly of the structure described hereinabove will now be described. When a load is applied to the hub axle 10, the outer member 1 is deformed through the rolling elements 5 and this deformation is transmitted to the sensor mounting member 17 of the sensor unit 16, fitted to the inner periphery of the outer member 1, resulting in a corresponding deformation of the sensor mounting member 17. This strain occurring in the sensor mounting member 17 is measured by the strain sensor 18. At this time, the sensor mounting member 17 deforms accompanying deformation of the fixing portion 17a, 17b of the sensor mounting member 17 in the radial direction. Since the sensor mounting member 17 is fitted to the position where it can be most deformed in the radial direction, the strain of the sensor mounting member 17 becomes so considerable that even the slightest strain of the outer member 1, which is the stationary member, can be detected by the sensor unit 16.

In general, the wheel support bearing assembly has various component parts of high rigidity in order to secure the performance thereof. Since for this reason, the strain occurring in the stationary member is small and it may occur that the relation between the strain occurring in the sensor unit and the force acting between the wheel tire and the road surface may vary depending on the interference between the stationary member and the knuckle as well as the mounting position of the sensor unit, difficulty often occurs in detecting the load with the sensor unit. In contrast thereto, with the sensor equipped wheel support bearing assembly of the present invention, since the spacers S intervene between portions of the vehicle body fitting flange 1a around the vehicle body fitting holes 9, which are defined in the outer member 1 serving as the stationary member, and the knuckle 25 forming a part of the suspension system in the vehicle body structure, and, since the outer member 1 and the knuckle 25 contact with each other through the spacer members 27 and do not contact with each other at any other portions. Accordingly, the area of tight contact between the outer member 1 and the knuckle 25 is so small that the amount of deformation of the outer member 1 may be large and, consequently, the strain occurring in the sensor mounting member 17 can be detected with high precision, allowing the sensor unit 16 to detect even the slight strain in the outer member 1.

Since the sensor mounting member 17 of the sensor unit 16 has the two contact fixing portions 17a and 17b fixed to the outer member 1 and also has the recess 17c defined at a portion thereof between the neighboring two contact fixing portions 17a and 17b, with the strain sensor 18 disposed at a portion aligned with this recess 17c, more considerable strain than the outer member 1 occurs as a result of lowering of the rigidity at the location, where the strain sensor 18 is mounted on the sensor mounting member 17, and, hence, the strain of the outer member 1 can be detected with high precision.

Also, the one contact fixing portion 17a, occupies the zenith position right above the longitudinal axis of the outer member 1, which lies on the circumference of the outer member 1 and where when an axially acting load is imposed on the outer member 1, the outer member 1 can be most deformed in a radial direction thereof, whereas the other contact fixing portion 17b occupies a position spaced a few tens degrees from the zenith position in a circumferential direction of the outer member 1, where the outer member 1 can be little deformed in the radial direction thereof. Accordingly, a further considerable strain occurs in a portion of the sensor mounting member 17, where the strain sensor 18 is mounted, when the contact fixing portion 17 undergoes a considerable deformation about a fulcrum represented by the contact fixing portion 17b, and, accordingly, the strain of the outer member 1 can be detected by the strain sensor 18 with high sensitivity.

Also, in this sensor equipped wheel support bearing assembly, since the strain sensor 18 is fitted to the sensor mounting member 17, that is fitted to the outer member 1 which is the stationary member, to thereby form the sensor unit 16, the load sensor can be snugly and neatly mounted on the automotive vehicle. Since the sensor mounting member 17 is a handy component part that can be fitted to the outer member 1 which is the stationary member, fitting the strain sensor 18 thereto makes it possible to accomplish an excellent mass productivity and also to reduce the cost.

From the value of strain so detected in the manner described above, it is possible to detect the external force or the like acting on the wheel support bearing assembly. Since change in strain varies depending on the direction and the magnitude of the load, the external force acting on the wheel support bearing assembly or the force acting between the wheel tire and the road surface can be calculated if the relation between the strain and the load is determined beforehand by means of a series of experiments or simulations. The external force calculating section 21 and the road surface acting force calculating section 22 are operable in response to the output from the strain sensor 18 to calculate the external force acting on the wheel support bearing assembly and the force acting between the wheel tire and the road surface, in reference to the relation between the strain and the load so determined beforehand by means of the experiments or simulations.

The abnormality determining section 24 is operable to output an abnormality signal to the outside in the event that the force acting between the wheel tire and the road surface or the external force acting on the wheel support bearing assembly so calculated is determined as exceeding a predetermined allowance. This abnormality signal can be utilized in vehicle control of the automotive vehicle.

Also, since the external force acting on the wheel support bearing assembly or the force acting between the wheel tire and the road surface is outputted in real time by the external force calculating section 21 and the road surface acting force calculating section 22, a sophisticated vehicle control can be accomplished.

While the wheel support bearing assembly is applied a preload through the inner ring 11, the sensor mounting member 17 will deform even under the influence of such preload. For this reason, if the relation between the strain and the preload is determined beforehand by means of a series of experiments or simulations, it is possible to ascertain the condition of preload in the wheel support bearing assembly. The bearing preload amount calculating section 23 is operable in response to an output from the strain sensor 18 to output a bearing preload amount in reference to the relation between the strain and the preload so determined beforehand by means of the experiments or simulations. Also, if the preload amount outputted from the bearing preload amount calculating section 23 is utilized, adjustment of the preload during assemblage of the wheel support bearing assembly can be facilitated.

In the foregoing embodiment, although the sensor unit 16 is disposed on that portion of the inner periphery of the outer member 1 remote from the road surface, the sensor unit 16 may be disposed on a portion of the inner periphery of the outer member 1 on one side confronting the road surface (right below the zenith position).

Figure 5:
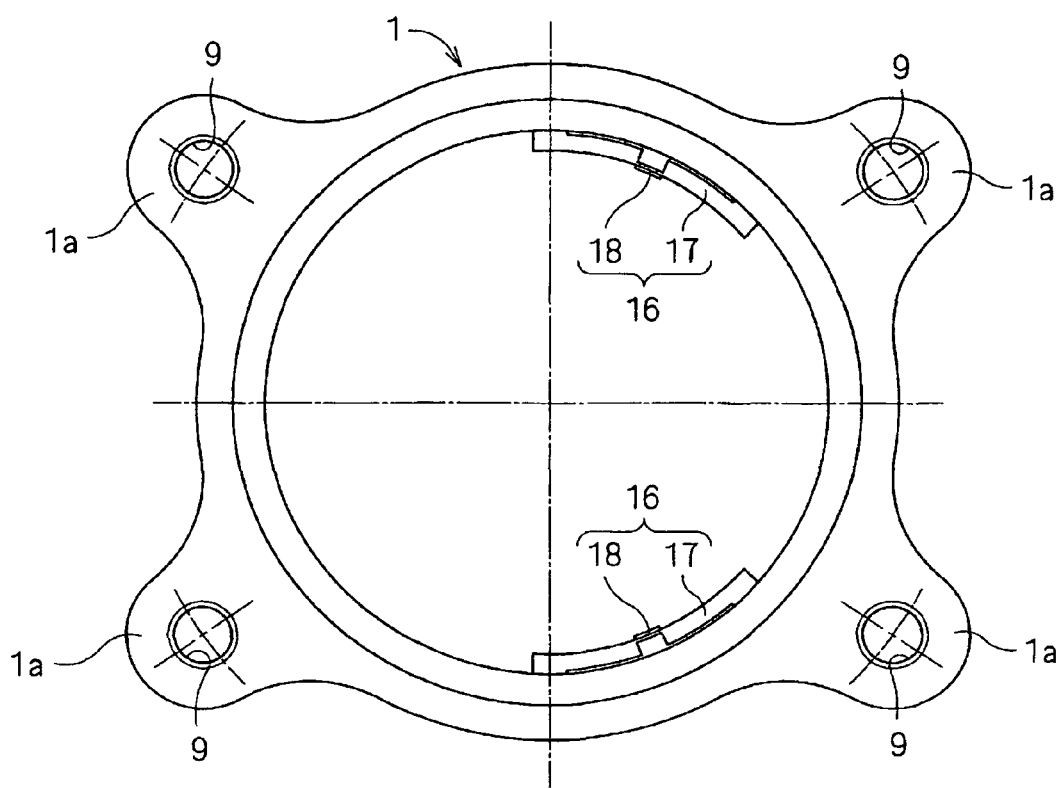
FIG. 5 is a front elevational view showing another arrangement of the sensor unit on the outer member, as viewed from the outboard side.

Also, as shown in FIG. 5, the sensor unit 16 may be disposed on that portion of the inner periphery of the outer member 1 remote from the road surface and, also, on a portion of the inner periphery of the outer member 1 on one side confronting the road surface (right below the zenith position).

Figure 6:
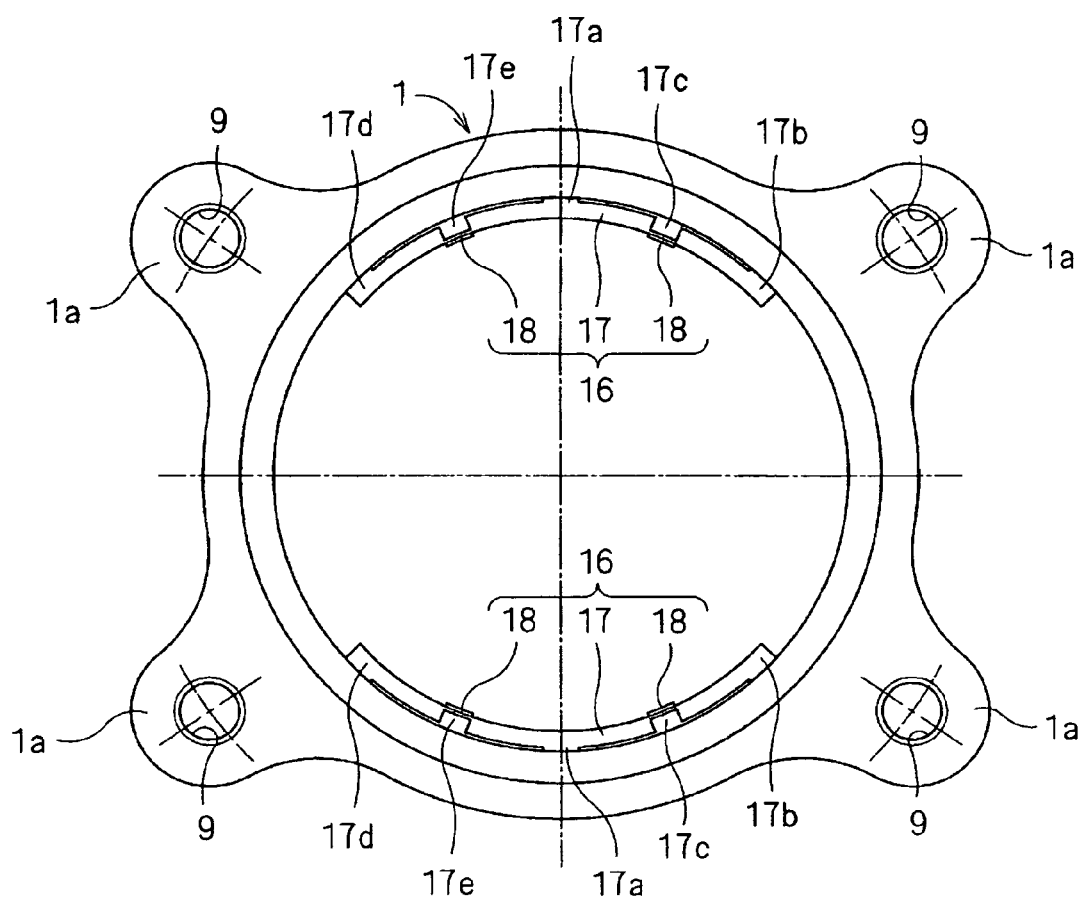
FIG. 6 is a front elevational view showing a different arrangement of the sensor unit on the outer member, as viewed from the outboard side.

Yet, as shown in FIG. 6 each of the sensor units 16 shown in FIG. 5 may be so structured as to have three contact fixing portions 17a, 17b and 17d and two recesses 17c and 17e one positioned between the neighboring contact fixing portions 17a and 17b and other positioned between the neighboring contact fixing portions 17a and 17d and opening at the outer periphery of the respective sensor units 16.

Figure 7:
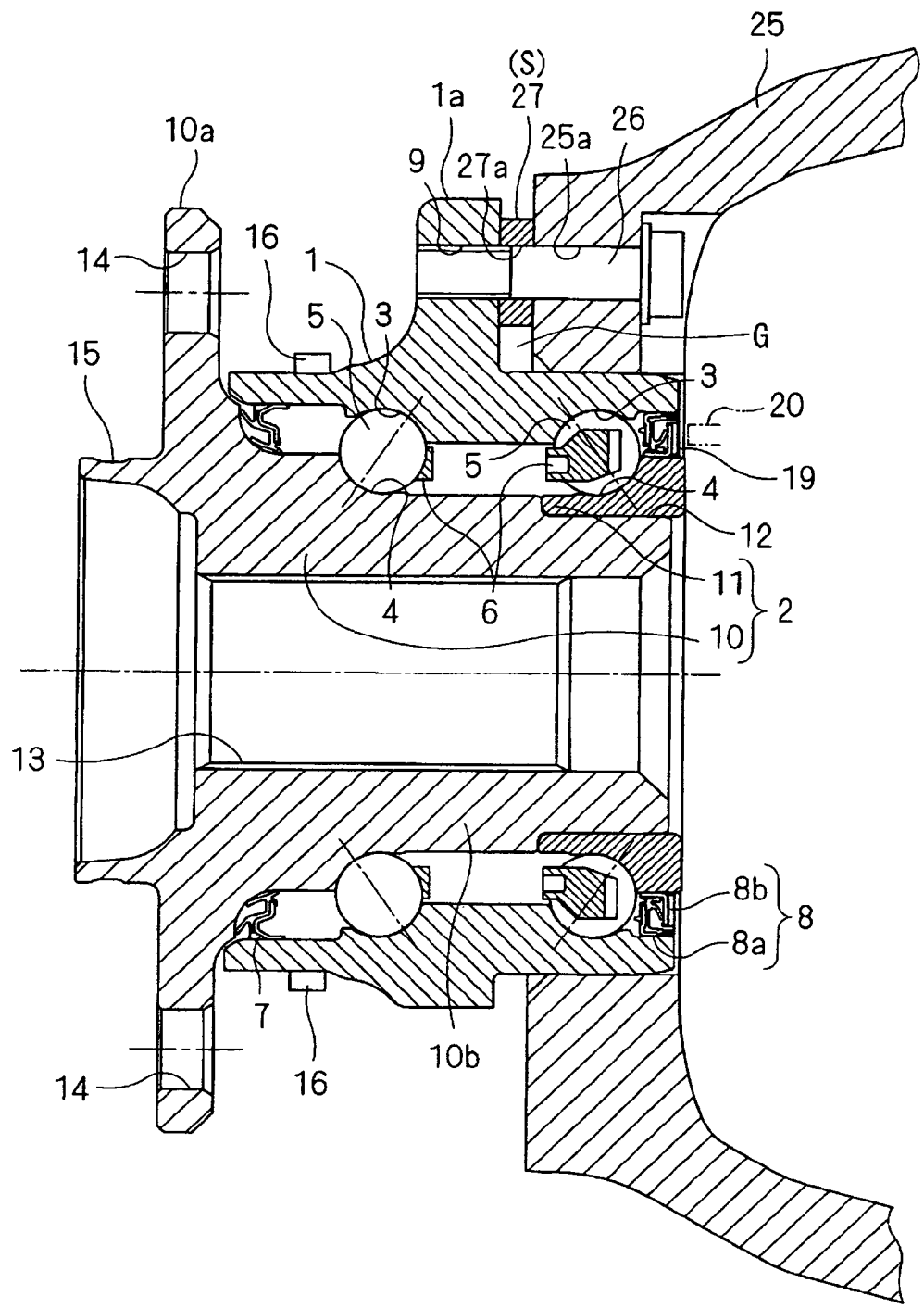
FIG. 7 is a longitudinal sectional view of the sensor equipped wheel support bearing assembly according to a second preferred embodiment of the present invention.
Figure 8:
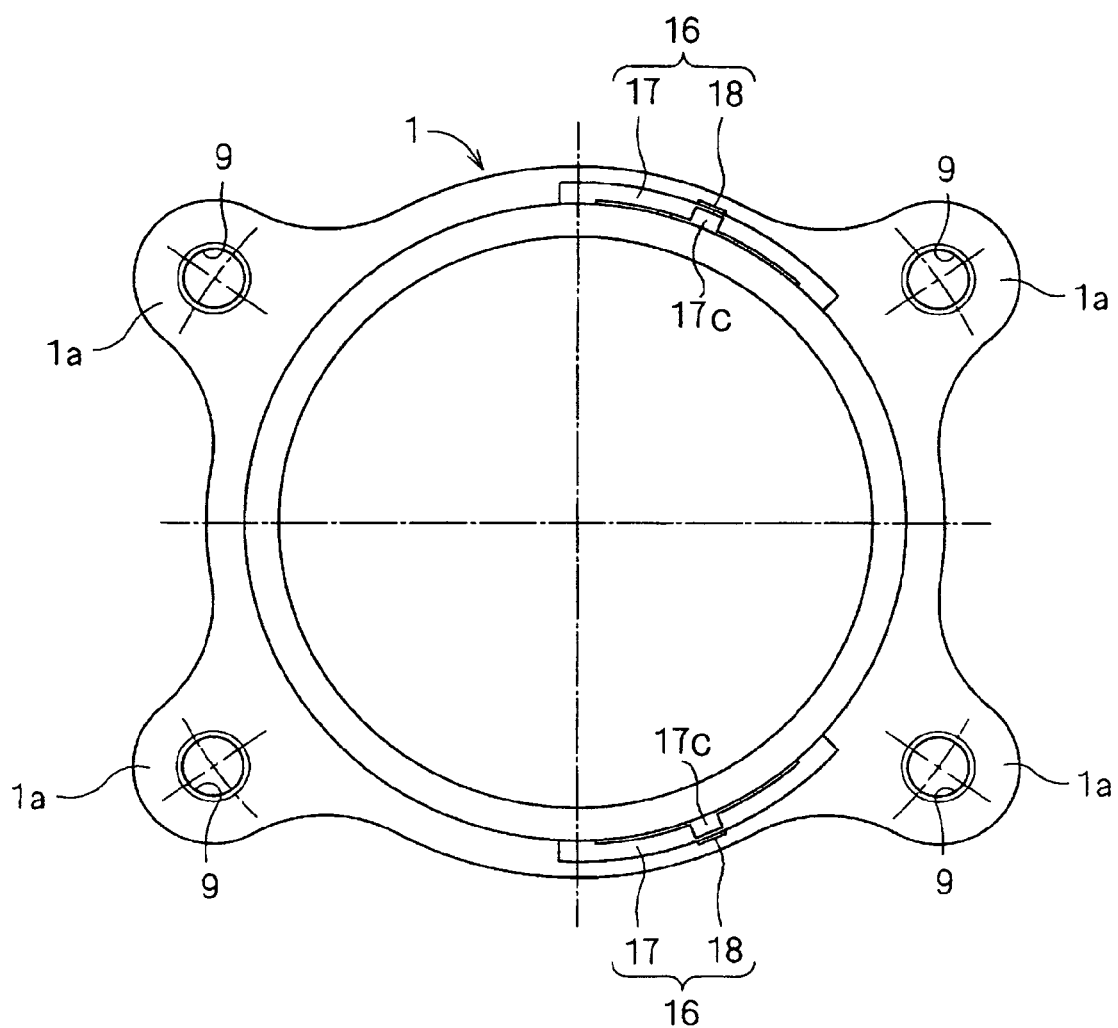
FIG. 8 is a front elevational view showing the outer member employed in the wheel support bearing assembly as viewed from the outboard side.

In addition, each of the sensor unit 16 may be disposed on an outer periphery of the outer member 1 as shown in a second preferred embodiment in FIGS. 7 and 8. In such case, the contact fixing portions 17a and 17b of the sensor mounting member 17 are so formed as to protrude in a direction radially inwardly of the arcuate shape of the sensor mounting member 17 and also to extend in the circumferential direction, with the respective recesses 17c opening radially inwardly of the arcuate shape of the sensor mounting member 17.

In any of those embodiments, it is necessary to design and form the sensor mounting member 17 which does not undergo a plastic deformation even when the maximum expected load is imposed on the wheel support bearing assembly.

Figure 9:
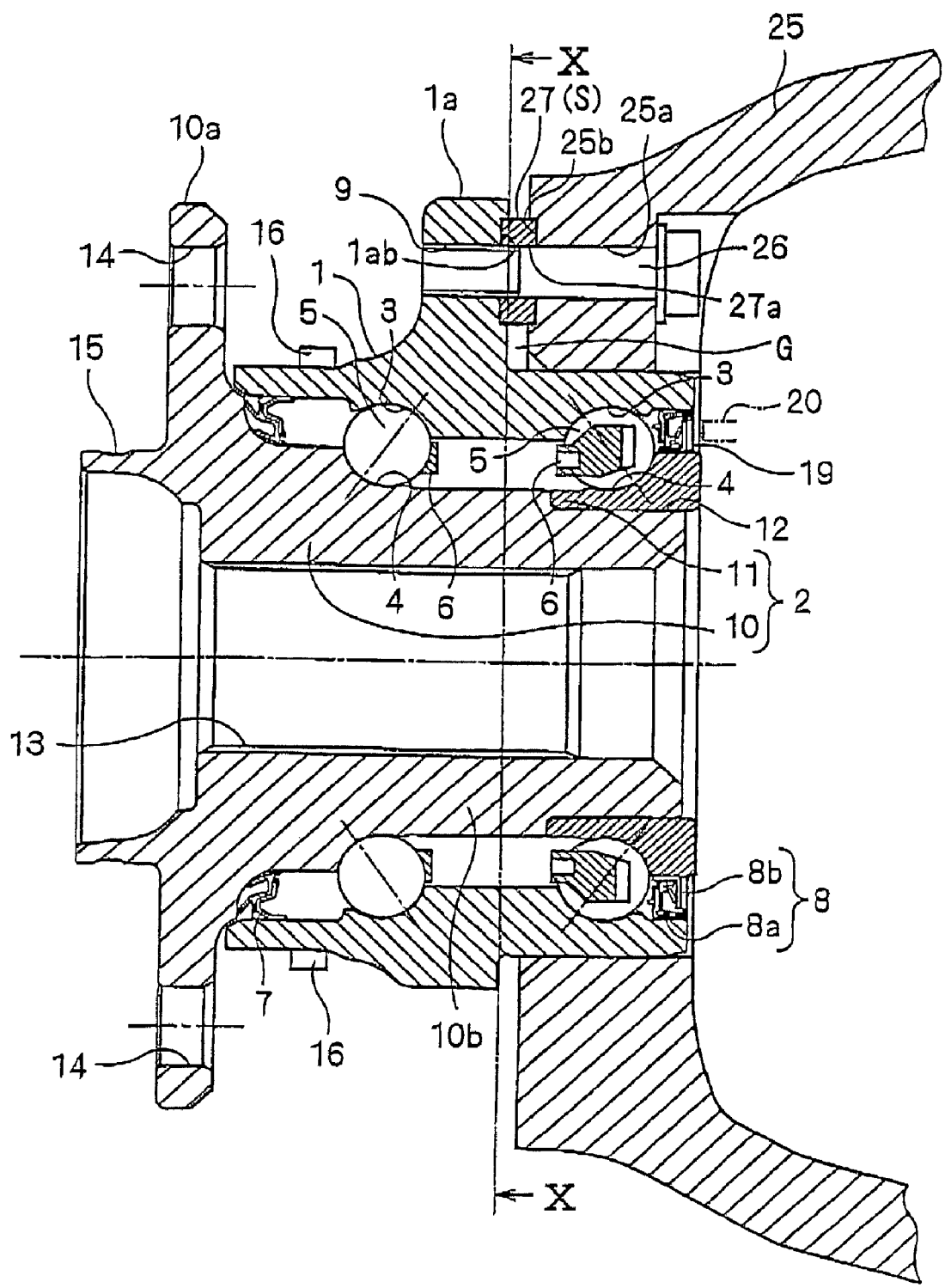
FIG. 9 is a longitudinal sectional view of the sensor equipped wheel support bearing assembly according to a third preferred embodiment of the present invention.
Figure 10:
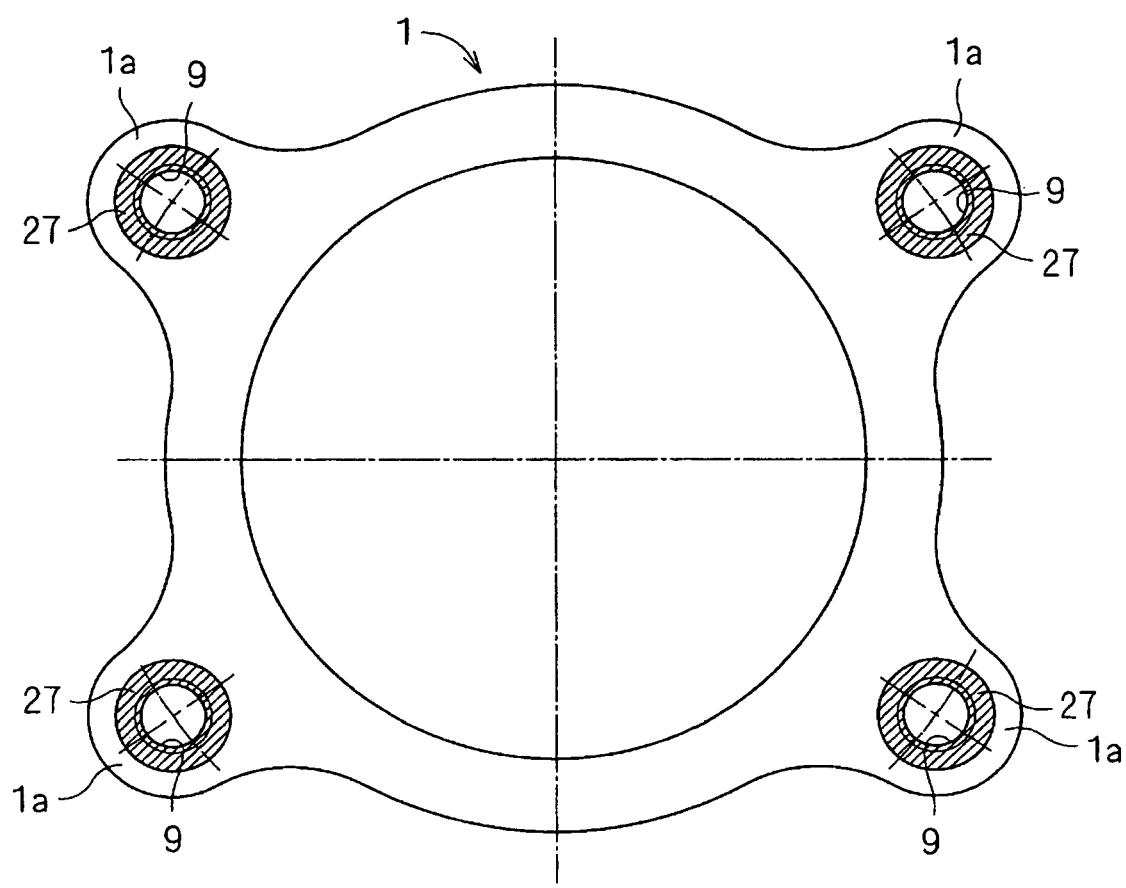
FIG. 10 is a cross-sectional view of the outer member taken along the line X-X in FIG. 9.

FIGS. 9 and 10 illustrate a third preferred embodiment of the present invention, in which FIG. 10 shows a cross-sectional view taken along the line X-X in FIG. 9. In the sensor equipped wheel bearing assembly according to this embodiment, mounting recesses 1ab are formed around the respective vehicle body fitting holes 9 defined in the surface of the vehicle body fitting flange 1a, which confronts the knuckle, and also, similar mounting recesses 25b are formed in the knuckle 25 in alignment with those mounting recesses 1ab. The spacer members 27 are interposed between those mounting recesses 1ab and 25b while received in part within the mounting recesses 1ab and in part within the mounting recesses 25b, respectively. In such case, each of the spacer members 27 has a thickness enough to avoid contact between the vehicle body fitting flange 1a and the knuckle 25 when the spacer members 27 are so interposed between the associated mounting recesses 1ab and 25b. Other structural features than those described above are similar to those employed in the second embodiment show in and described with particular reference to FIGS. 7 and 8.

As hereinabove described, the use of the spacer members 27 between the mounting recesses lab in the vehicle body fitting flange 1a and the mounting recesses 25b in the knuckle 25 is effective to facilitate positioning of the wheel support bearing assembly relative to the knuckle 25.

Figure 11:
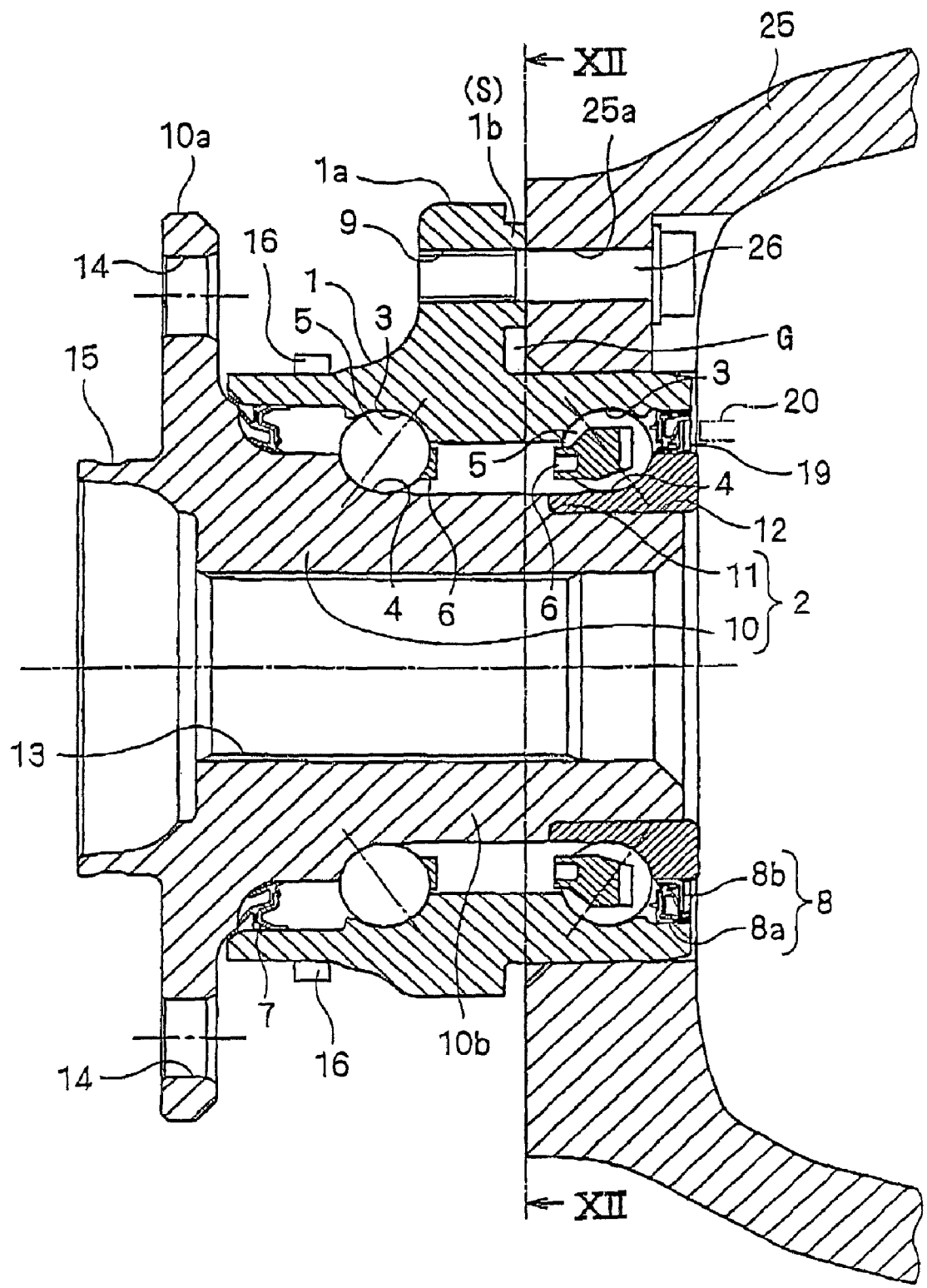
FIG. 11 is a longitudinal sectional view of the sensor equipped wheel support bearing assembly according to a fourth preferred embodiment of the present invention.
Figure 12:
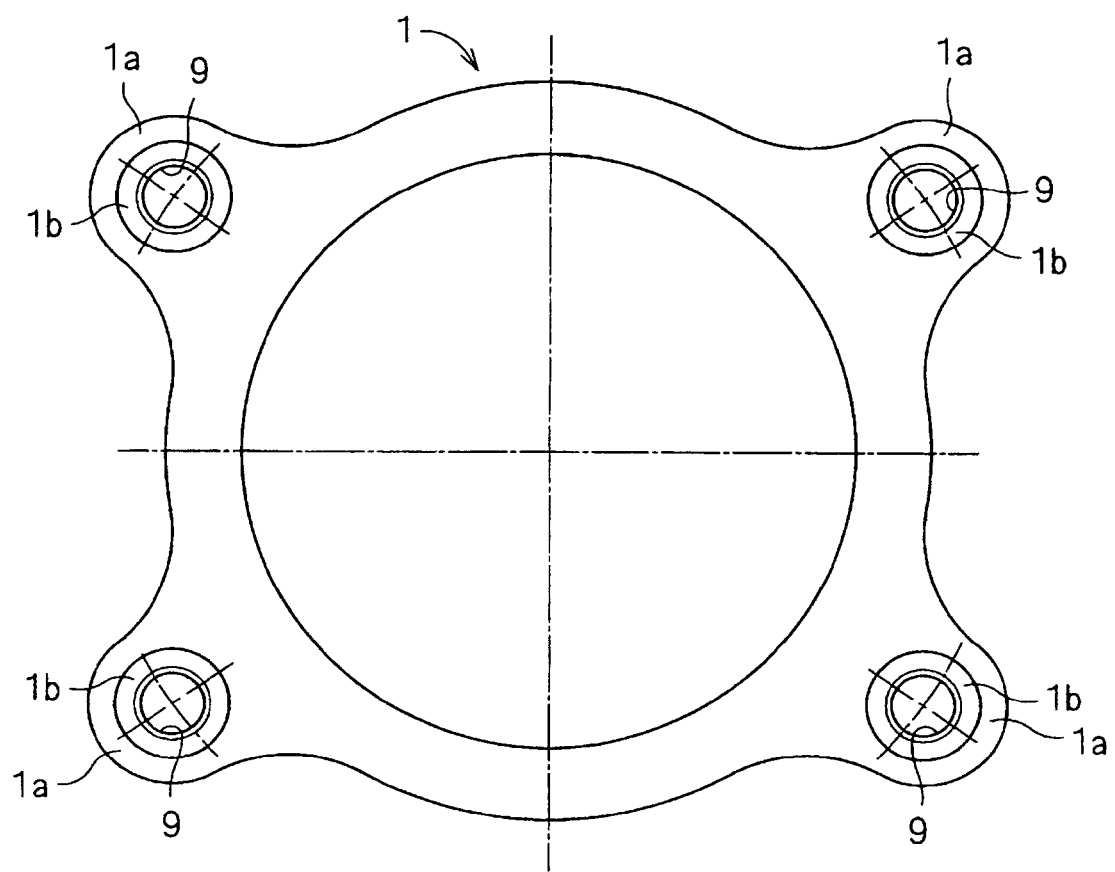
FIG. 12 is a cross-sectional view of the outer member taken along the line XII-XII in FIG. 11.

FIGS. 11 and 12 illustrate a fourth preferred embodiment of the present invention, in which FIG. 12 shows a cross-sectional view taken along the line XII-XII in FIG. 11. In the sensor equipped wheel support bearing assembly according to this embodiment, in place of the spacer members 27 employed in the sensor equipped wheel support bearing assembly according to the second embodiment shown in and described with reference to FIGS. 7 and 8, the spacers S, each in the form of a projection 1b formed integrally with the outer member 1, are provided around the vehicle body fitting holes 9 in the surface of the vehicle body fitting flange 1a of the outer member 1, which confronts the knuckle, and the vehicle body fitting flange 1a is engaged in contact with the knuckle 25 only through the projections 1b while a gap G is formed between the remaining portion of the vehicle body fitting flange 1a and the knuckle 25. Other structural features thereof than those described above are similar to those employed in the second embodiment shown in and described with reference to FIGS. 7 and 8.

As hereinabove described, in place of the spacer members 27 employed in the second embodiment shown in and described with reference to FIGS. 7 and 8, the use of the projections 1b in the surface of the vehicle body fitting flange 1a confronting the knuckle 25 is effective to reduce the number of component parts used and, correspondingly, connection of the wheel support bearing assembly with the knuckle 25 can be simplified.

Figure 13:
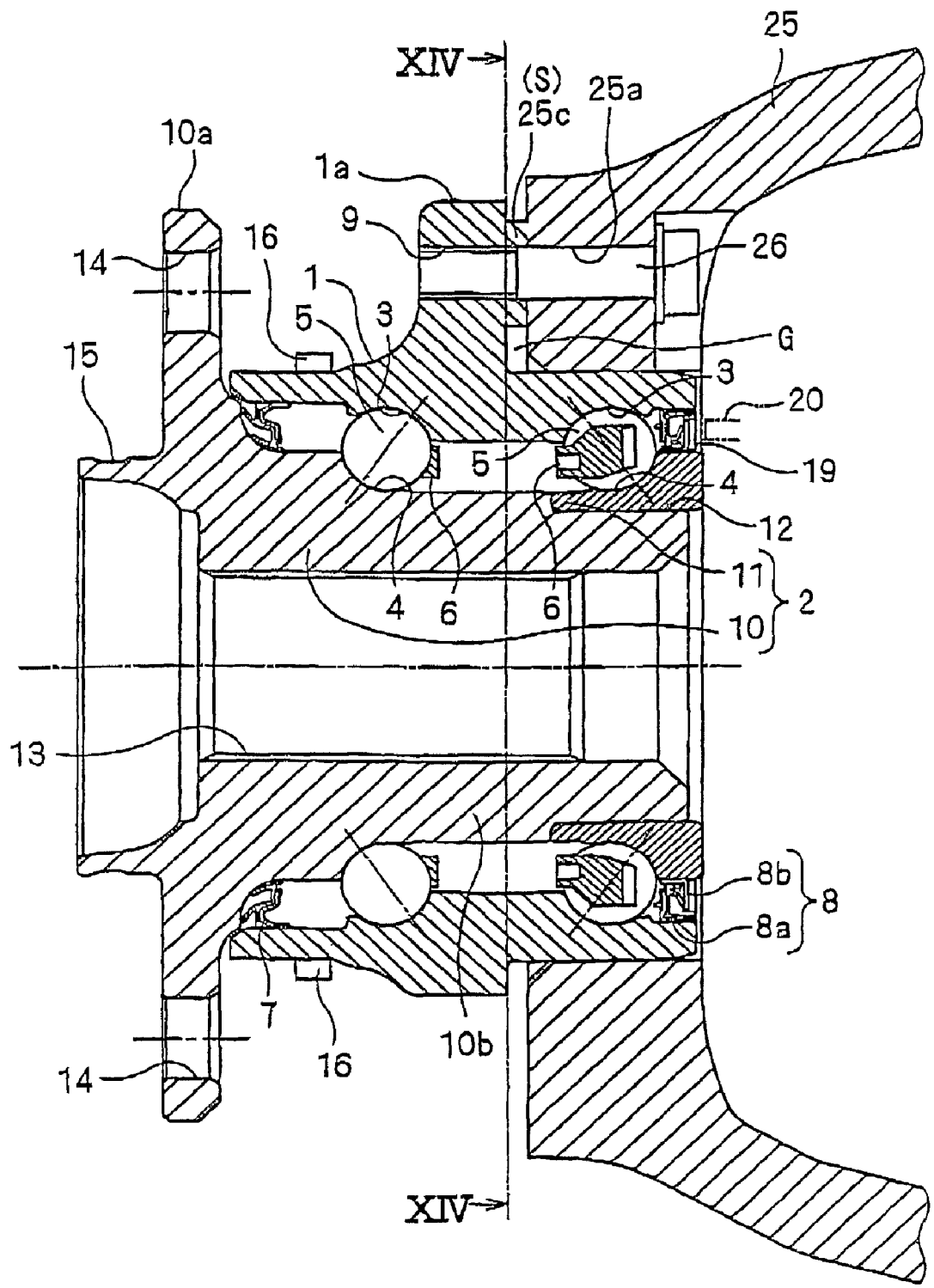
FIG. 13 is a longitudinal sectional view of the sensor equipped wheel support bearing assembly according to a fifth preferred embodiment of the present invention.
Figure 14:
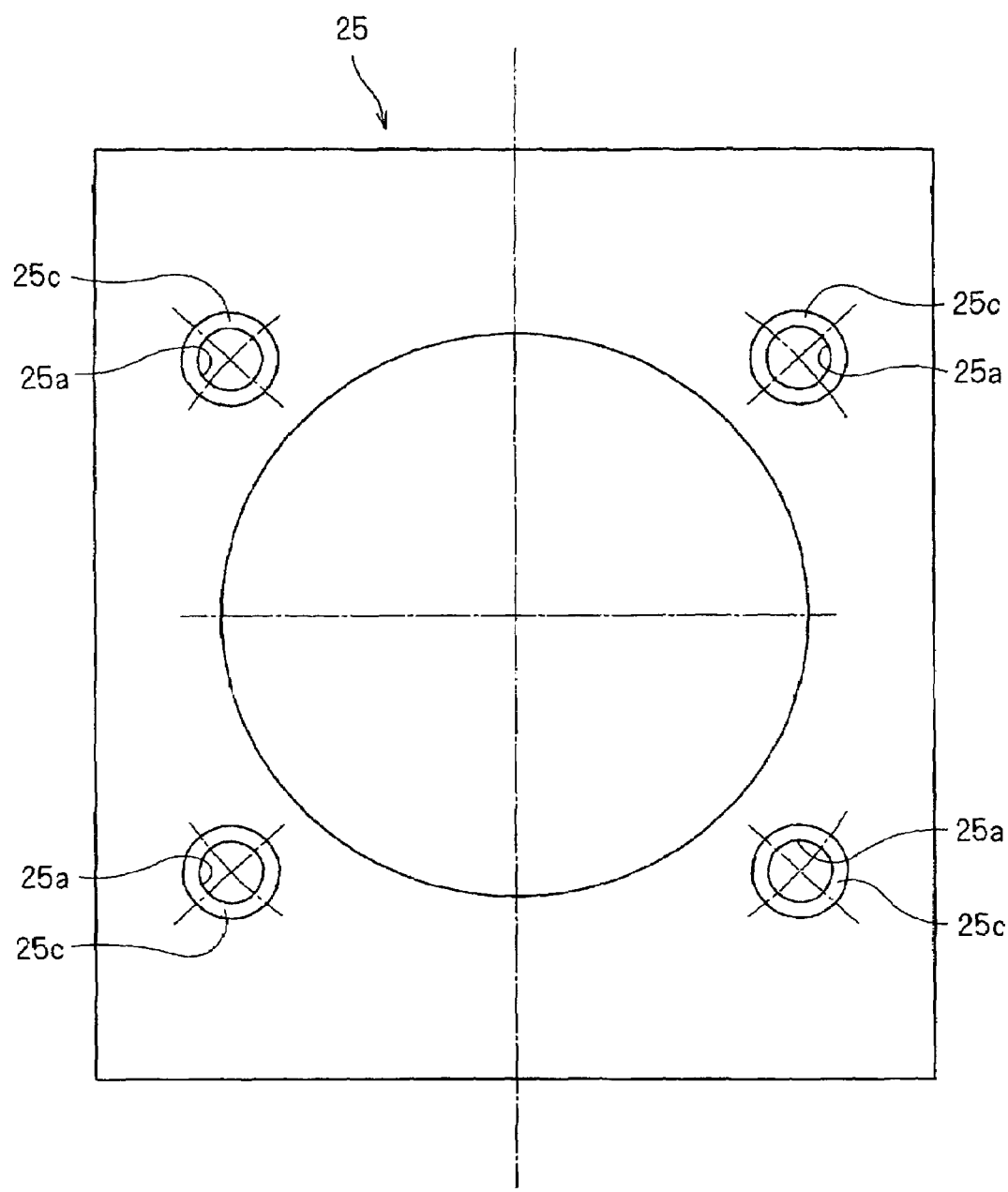
FIG. 14 is a cross-sectional view of a knuckle taken along the line XIV-XIV in FIG. 13.

FIGS. 13 and 14 illustrate a fifth preferred embodiment of the present invention, in which FIG. 14 shows a cross-sectional view taken along the line XIV-XIV in FIG. 13. In the sensor equipped wheel support bearing assembly according to this embodiment, in place of the spacer members 27 employed in the sensor equipped wheel support bearing assembly according to the second embodiment shown in and described with reference to FIGS. 7 and 8, the spacers S, each in the form of a projection 25c formed integrally with the knuckle 25, are provided around the bolt insertion holes 25a in the surface of the knuckle 25 confronting the vehicle body fitting flange 1a, and the knuckle 25 is engaged in contact with the vehicle body fitting flange 1a only through the projections 25c. Other structural features thereof than those described above are similar to those employed in the second embodiment shown in and described with reference to FIGS. 7 and 8.

As hereinabove described, in place of the spacer members 27 employed in the second embodiment shown in and described with reference to FIGS. 7 and 8, the use of the projections 25c in the surface of the knuckle 25 confronting the vehicle body fitting flange 1a is effective to reduce the number of component parts used and, correspondingly, connection of the wheel support bearing assembly with the knuckle 25 can be simplified.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in any one of the foregoing embodiments of the present invention, the outer member has been referred to as the stationary member, the present invention can be equally applied to the wheel support bearing assembly, in which the inner member serves as the stationary member. In such case, the sensor mounting member 17 is fitted to the peripheral surface, which forms either the outer periphery or the inner periphery of the inner member.

Also, although in any one of the foregoing embodiments reference has been made to the wheel support bearing assembly which is of the third generation type, the present can be equally applied to the wheel support bearing assembly of a first or second generation type, in which the bearing portion and the hub are prepared from members separate from each other, and, also, to the wheel support bearing assembly of a fourth generation type, in which a portion of the inner member is defined by the outer ring of the constant velocity universal joint. Yet, the wheel support bearing assembly of the present invention can also be applied to that for the support of a vehicle driven wheel and, moreover, to the wheel support bearing assembly of any generation type utilizing tapered rollers.

Accordingly, such changes and modifications are, unless they depart from the scope of the present invention as delivered from the claims annexed hereto, to be construed as included therein.

What is claimed is:

1. A sensor equipped wheel support bearing assembly for rotatably supporting a vehicle wheel relative to a vehicle body structure, comprising:
    an outer member having an inner periphery formed with a plurality of rows of raceway surfaces;
    an inner member having an outer periphery formed with raceway surfaces in face-to-face relation with the raceway surfaces in the outer member; and a plurality of rows of rolling elements interposed between those raceway surfaces, respectively, wherein one of the outer member and the inner member, which serves as a stationary member, has a vehicle body fitting flange having vehicle body fitting holes defined therein and a spacer is provided between a portion of the vehicle body fitting flange around each of the vehicle body fitting holes and a knuckle forming a part of a suspension system in the vehicle body structure, with a gap formed between respective opposed surfaces of the stationary member and the knuckle when the spacer is excluded, wherein the stationary member and the knuckle are held in contact with each other through the respective spacer, wherein a sensor unit including a sensor mounting member and a strain sensor mounted on the sensor mounting member is fitted to the stationary member, and wherein the sensor mounting member has at least two contact fixing portion fixed to the stationary member and also has at least one recess between the neighboring contact fixing portion, with the strain sensor arranged in this recess.

2. The sensor equipped wheel support bearing assembly as claimed in claim 1, wherein the spacer comprises a spacer member which is separate from the stationary member and the knuckle.

3. The sensor equipped wheel support bearing assembly as claimed in claim 2, wherein the spacer member is engaged in a recess defined in the vehicle body fitting hole and the knuckle.

4. The sensor equipped wheel support bearing assembly as claimed in claim 3, wherein a mounting recess is provided around the vehicle body fitting hole formed in the stationary member, a mounting recess is provided in the knuckle in face-to-face relation with this mounting recess, and the spacer member is engaged in the mutually confronting mounting recesses so that the wheel support bearing assembly relative to the knuckle can be positioned.

5. The sensor equipped wheel support bearing assembly as claimed in claim 1, wherein the spacer is in the form of a projection formed integrally around the wheel body fitting hole in the vehicle body fitting flange of the stationary member.

6. The sensor equipped wheel support bearing assembly as claimed in claim 1, wherein the spacer is formed integrally around a bolt insertion hole in a surface of the knuckle which confronts the vehicle body fitting flange of the stationary member.

7. The sensor equipped wheel support bearing assembly as claimed in claim 1, wherein the stationary member is the outer member.

* * * * *